(12) United States Patent
Thunström et al.

(10) Patent No.: US 9,898,081 B2
(45) Date of Patent: Feb. 20, 2018

(54) GAZE AND SACCADE BASED GRAPHICAL MANIPULATION

(71) Applicant: Tobii AB, Danderyd (SE)

(72) Inventors: Robin Thunström, Stockholm (SE); Mårten Skogö, Dandeyrd (SE)

(73) Assignee: Tobii AB, Danderyd (SE)

( * ) Notice: Subject to any disclaimer, the term of this patent is extended or adjusted under 35 U.S.C. 154(b) by 0 days.

(21) Appl. No.: 15/270,783

(22) Filed: Sep. 20, 2016

(65) Prior Publication Data

US 2017/0011492 A1    Jan. 12, 2017

Related U.S. Application Data

(63) Continuation-in-part of application No. 14/197,171, filed on Mar. 4, 2014.

(60) Provisional application No. 61/772,366, filed on Mar. 4, 2013.

(51) Int. Cl.
*G06F 3/01*        (2006.01)
*G06T 19/20*       (2011.01)
*G06T 11/80*       (2006.01)

(52) U.S. Cl.
CPC ............. *G06F 3/013* (2013.01); *G06T 19/20* (2013.01); *G06T 2210/36* (2013.01)

(58) Field of Classification Search
CPC ............. G06F 3/013; G09G 5/37; G06T 5/00
USPC ....................................................... 345/156
See application file for complete search history.

(56) References Cited

U.S. PATENT DOCUMENTS

| 4,348,186 A | * | 9/1982 | Harvey | G09B 9/307 |
| | | | | 434/44 |
| 4,836,670 A | * | 6/1989 | Hutchinson | A61B 3/113 |
| | | | | 351/210 |
| 5,583,795 A | | 12/1996 | Smyth | |
| 6,028,608 A | * | 2/2000 | Jenkins | G06T 1/0021 |
| | | | | 345/619 |
| 6,182,114 B1 | * | 1/2001 | Yap | G06F 17/30905 |
| | | | | 707/E17.121 |
| 6,252,989 B1 | * | 6/2001 | Geisler | H04N 19/176 |
| | | | | 345/555 |
| 6,351,335 B1 | | 2/2002 | Perlin | |

(Continued)

FOREIGN PATENT DOCUMENTS

| WO | 1998/033315 A2 | 10/1998 | |
| WO | WO 2008134014 A2 | * 11/2008 | ............. G06F 3/013 |

OTHER PUBLICATIONS

Reingold, E.M. et al. "Gaze-Contingent Multiresolutional Displays: An Integrative Review". Human Factors v. 45 No. 2 p. 307-327 (Summer 2003).*

(Continued)

*Primary Examiner* — Julie Anne Watko
(74) *Attorney, Agent, or Firm* — Kilpatrick Townsend & Stockton LLP

(57) ABSTRACT

According to the invention, a system for presenting graphics on a display device is disclosed. The system may include an eye tracking device and a graphics processing device. The eye tracking device may be for determining a gaze point of a user on a display device. The graphics processing device may be for causing graphics to be displayed on the display device. The graphics displayed on the display device may be modified such that the graphics are of higher quality in an area including the gaze point of the user, than outside the area.

24 Claims, 9 Drawing Sheets

(56) References Cited

U.S. PATENT DOCUMENTS

| | | | |
|---|---|---|---|
| 6,421,185 B1 | 7/2002 | Wick et al. | |
| 6,798,443 B1* | 9/2004 | Maguire, Jr. | G06F 3/011 345/8 |
| 7,027,655 B2* | 4/2006 | Keeney | H04N 19/115 375/E7.182 |
| 7,572,008 B2 | 8/2009 | Elvesjo et al. | |
| 7,573,439 B2* | 8/2009 | Lau | G06F 3/013 345/7 |
| 7,850,306 B2* | 12/2010 | Uusitalo | G02B 27/017 351/202 |
| 8,020,993 B1* | 9/2011 | Fram | G06F 3/013 351/200 |
| 8,775,975 B2* | 7/2014 | Karmarkar | G06F 3/013 345/473 |
| 9,423,871 B2* | 8/2016 | Sukumar | G06F 3/013 |
| 9,638,495 B2 | 5/2017 | Stanley | |
| 9,727,991 B2 | 8/2017 | Guenter et al. | |
| 2004/0207635 A1 | 10/2004 | Miller et al. | |
| 2004/0227699 A1 | 11/2004 | Mitchell | |
| 2005/0018911 A1 | 1/2005 | Deever | |
| 2008/0111833 A1 | 5/2008 | Thorn et al. | |
| 2010/0061553 A1* | 3/2010 | Chaum | G06F 21/10 380/200 |
| 2012/0105310 A1 | 5/2012 | Sverdrup et al. | |
| 2012/0156652 A1 | 6/2012 | Lane et al. | |
| 2013/0321265 A1 | 12/2013 | Bychkov et al. | |
| 2014/0247277 A1 | 9/2014 | Guenter et al. | |
| 2015/0205126 A1 | 7/2015 | Schowengerdt | |
| 2015/0362991 A1* | 12/2015 | Koga | G06F 3/013 715/810 |
| 2017/0235362 A1 | 8/2017 | Thunström et al. | |

OTHER PUBLICATIONS

Arnow, T.L. et al. "Foveated Visual Search for Corners". IEEE Transactions on Image Processing, v. 16 No. 3 p. 813-823 (Mar. 2007).*

Nystrom, M. et al. "Effect of Compressed Offline Foveated Video on Viewing Behavior and Subjective Quality". ACM Transactions on Multimedia Computing, Communications and Applications, v. 6, No. 1, Article 4, p. 4:1-4:14 (Feb. 2010).*

U.S. Appl. No. 14/197,171, Final Office Action dated Jul. 28, 2016, 2 pages.

U.S. Appl. No. 14/197,171, Non-Final Office Action dated Dec. 24, 2015, 3 pages.

U.S. Appl. No. 14/197,171, Notice of Allowance dated Jan. 27, 2017, 9 pages.

U.S. Appl. No. 14/197,171, Advisory Action dated Dec. 13, 2016, 5 pages.

Guenter, et al.; "Foveated 3D Graphics"; Microsoft Research, Nov. 20, 2012; all pages. Retrieved from the Internet: https://www.microsoft.com/en-us/research/publication/foveated-3d-graphics/.

Final Office Action dated Oct. 11, 2017 for U.S. Appl. No. 14/467,877; all pages.

* cited by examiner

GAZE AND SACCADE BASED GRAPHICAL MANIPULATION

CROSS-REFERENCE TO RELATED APPLICATIONS

This application is a continuation-in-part of U.S. patent application Ser. No. 14/197,171, filed Mar. 4, 2014, entitled "GAZE BASED GRAPHICAL MANIPULATION," which claims priority to Provisional U.S. Patent Application No. 61/772,366, filed Mar. 4, 2013, entitled "GAZE BASED GRAPHICAL MANIPULATION," the entire disclosures of which are hereby incorporated by reference, for all purposes, as if fully set forth herein.

BACKGROUND OF THE INVENTION

Graphical items may be used on a display to show data and information to a viewer. These graphical items may include text, images, and video. Graphical items in the area of computing are well known and have been in use for many years. Recently, showing three dimensional (3D) graphical items on a display has increased in importance in areas such as gaming, modeling and movies.

When displaying graphical items, a system such as a computer uses a processor in combination with memory to display the items on a screen or other display device. Methods for displaying graphical items vary, but typically they rely on a computer interpreting commands to control a graphics processing device that provides graphical items for display. The graphics processing device typically contains custom hardware for this purpose including a processor and memory. In some computer systems the graphics processing device is fully integrated, and in others it is provided as a separate component known as a graphics card.

Graphics processing devices have limits on their processing power, usually quantified in terms of the amount of graphical items that can be displayed on a screen at any given time. This is typically limited by the capabilities of the hardware embodying the graphics processing device, including processors, memory, and communication channels. Additionally, the amount of graphical items able to be displayed on a screen at a given point can be limited by communication limits between the graphics processing device and computer.

In many scenarios that require graphical items be displayed on a screen, a user only focuses on a portion of the screen, and therefore only a portion of the graphical items, an any given time. Meanwhile, other graphical items continue to be displayed on the remaining portions of the screen, which the user is not focused on. This wastes valuable graphics processing device resources to produce graphical items that cannot be fully appreciated by the user because the visual acuity of a human drops dramatically outside those images immediately focused on.

BRIEF DESCRIPTION OF THE INVENTION

In some embodiments, a system for presenting graphics on a display device is provided. The system may include an eye tracking device and a graphics processing device. The eye tracking device may be for determining a gaze point of a user on a display device. The graphics processing device may be for causing graphics to be displayed on the display device. The graphics displayed on the display device may be modified such that the graphics are of higher quality in an area including the gaze point of the user, than outside the area.

In another embodiment, a method for presenting graphics on a display device is provided. The method may include determining, with an eye tracking device, a gaze point of a user on a display device. The method may also include causing, with a graphics processing device, graphics to be displayed on the display device. The graphics displayed on the display device may be modified such that the graphics are of higher quality in an area including the gaze point of the user, than outside the area.

In another embodiment, a non-transitory machine readable medium having instructions thereon for presenting graphics on a display device is provided. The instructions may be executable by one or more processors to perform a method. The method may include determining a gaze point of a user on a display device, and causing graphics to be displayed on the display device. The graphics displayed on the display device may be modified such that the graphics are of higher quality in an area including the gaze point of the user, than outside the area.

In another embodiment, a system for presenting graphics on a display device is provided. The system may include an eye tracking device in a user wearable device for determining a gaze point of a user on a display device
a processing device for causing graphics to be displayed on the display device;
wherein the graphics displayed on the display device are modified such that the graphics are of higher quality in an area including the gaze point of the user, than outside the area.

BRIEF DESCRIPTION OF THE DRAWINGS

The present invention is described in conjunction with the appended figures.

Figure 1:
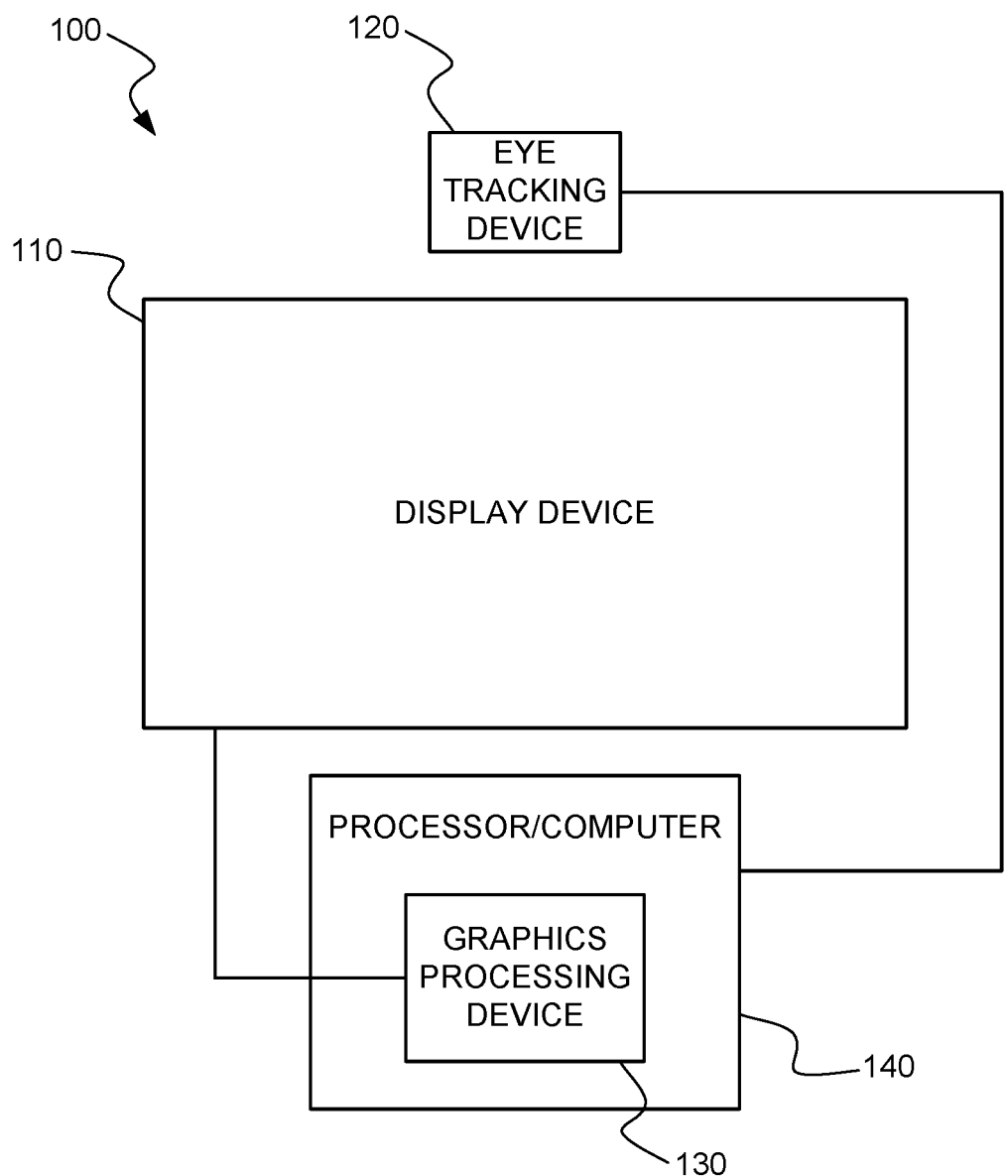
FIG. 1 is a block diagram of one possible system of the invention for modifying an image based on a user's gaze point.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other elements in the invention may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function. Any detail present in one discussed embodiment may or may not be present in other versions of that embodiment or other embodiments discussed herein.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In some embodiments of the invention, and with reference to FIG. 1, a system 100 for presenting graphics on a display device 110 is provided. System 100 may include an eye tracking device 120 and a graphics processing device 130. In some embodiments, the system may also include a processor/computer 140 which communicates with, and controls, graphics processing device 130. In some embodiments, any function of graphics processing device 130 may be performed, in whole or in part, by processor/computer 140. Merely by way of example, eye tracking device 120 may be provided integral to, or in addition to, a personal computer 140 having graphics processing device 130 and a central processing unit (in some configurations, graphics processing device 130 and the central processing unit are integrated). In other embodiments, eye tracking device 120 may be provided integral to, or in addition to, a gaming console 140 or other device having graphics processing device 130 and a central processing unit. Examples of gaming consoles include those produced and available from Microsoft™, Nintendo™, or Sony™. In other embodiments, the eye tracking device 120 may be provided integral to, or in addition to, a wearable headset such as a Virtual Reality (VR) or Augmented Reality (AR) or the like. Examples of wearable headsets include those produced and available under the names Oculus Rift™, HTC Vive™, Sony PlaystationVR™ and Fove™. Thus, embodiments of the invention may be applied to the presentation of graphics in any number of possible devices and applications, including video display, video games, video production and editing, video communications, computer aided drafting and design, etc.

Eye tracking device 120 may be for determining at least one of a gaze point of a user on display device 110, or a change in the gaze point of the user on display device 110. Eye tracking devices and methods, sometimes referred to as gaze detection systems and methods, include, for example, products produced and available from Tobii Technology AB, and which operate by using infrared illumination and an image sensor to detect reflection from the eye of a user. An example of such a gaze detection system is described in U.S. Pat. No. 7,572,008, which is hereby incorporated by reference, for all purposes, as if fully set forth herein. Other alternative gaze detection systems may also be employed by the invention, regardless of the technology behind the gaze detection system. Eye tracking device 120 may employ its own processor or the processor of another device (i.e., processor/computer 140) to interpret and process data received. When an eye tracking device is referred to herein, both possible methods of processing data are referred to.

Graphics processing device 130 employed by various embodiments of the invention may be for causing an image to be displayed on display device 110. Graphics processing device 130 may modify what image is displayed on display device 110 based at least in part on the gaze point of the user on display device 110, or a change in the gaze point of the user on display device 110, as determined by eye tracking device 120. While in some embodiments a separate non-included or non-integrated display device will be controlled by the graphics processing device 130, other embodiments may include or integrate display device 110.

Figure 2:
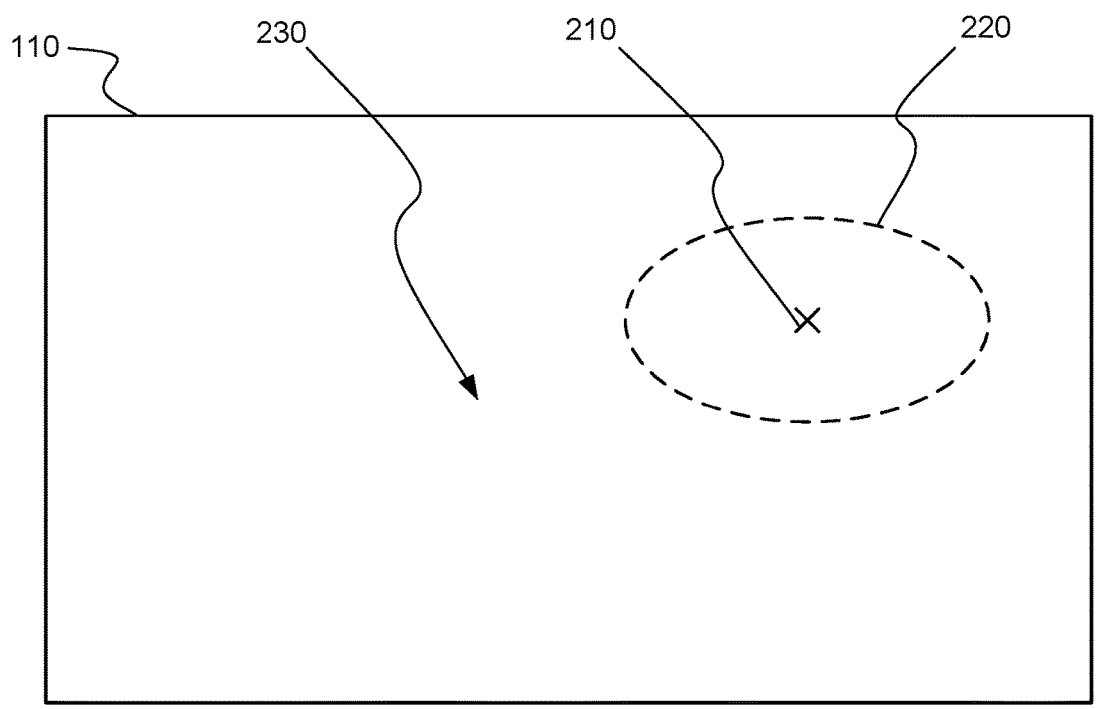
FIG. 2 is a view of a display device of the invention in which image modification is occurring in response to a user's gaze point.

The way in which the image displayed on display device 110 may be modified by graphics processing device 130 may vary depending on the embodiment, but regardless, the way in which the image is displayed may be intended to increase the image quality of portions of the image on which a user's gaze, or focused gaze, is directed, relative to those portions of the image to which the user's gaze, or focused gaze, is not directed. In this manner, the use of available resources of graphics processing device 130, and/or other system resources, are maximized to deliver image quality where it matters most on display device 110. To demonstrate, FIG. 2 illustrates a display device 110 showing a user's gaze point 210 and an area 220 around user's gaze point 210 in which embodiments of the invention may increase the quality of the image relative to the remaining area 230 of the display device 110. Thus, in various embodiments of the invention, the quality of the image produced across display device 110 may be increased in area 220 relative to remaining area 230.

When "modification" of an image presented on display device 110 is discussed herein, it shall be understood that what is intended is that a subsequent image displayed on display device 110, is different than a prior image displayed on display device 110. Thus, graphics processing device 130 and display device 110, or other device(s) discussed herein, "modify" an image by causing a first image to be displayed and then a second image to be displayed which is different than the first image. Any other change of an image discussed herein, for example, increasing or decreasing of image quality, shall also be understood to mean that a subsequent image is different than a prior image. Note that a change or modification of an image may include changing or modifying only a portion of the image. Thus, some portions of a prior image may be the same as a subsequent image, while other portions may be different. In other situations, the entirety of a prior image may be different than a subsequent image. It shall be understood that the modification of an area or an entirety of an image does not necessarily mean every finite portion of the area or entirety are changed (for example, each pixel), but rather that the area or entirety may be changed in some potentially consistent, predefined, or ordered manner (for example, the quality of the image is changed).

Increasing the quality of the image may include increasing the quality of any one or more of the below non-exclusive list of graphical characteristics, in addition to other possible characteristics known in the art:

Resolution: The number of distinct pixels that may be displayed in one or more dimensions. For example, "1024×768" means 1024 pixels displayed in height and 768 pixels displayed in width.

Shading: Variation of the color and brightness of graphical objects dependent on the artificial lighting projected by light sources emulated by graphics processing device 130.

Texture-mapping: The mapping of graphical images or "textures" onto graphical objects to provide the objects with a particular look. The resolution of the textures influence the quality of the graphical object to which they are applied.

Bump-mapping: Simulation of small-scale bumps and rough gradients on surfaces of graphical objects.

Fogging/participating medium: The dimming of light when passing through non-clear atmosphere or air.

Shadows: Emulation of obstruction of light.

Soft shadows: Variance in shadowing and darkness caused by partially obscured light sources.

Reflection: Representations of mirror-like or high gloss reflective surfaces.

Transparency/opacity (optical or graphic): Sharp transmission of light through solid objects.

Translucency: Highly scattered transmission of light through solid objects.

Refraction: Bending of light associated with transparency.

Diffraction: Bending, spreading and interference of light passing by an object or aperture that disrupts the light ray.

Indirect illumination: Surfaces illuminated by light reflected off other surfaces, rather than directly from a light source (also known as global illumination).

Caustics (a form of indirect illumination): Reflection of light off a shiny object, or focusing of light through a transparent object, to produce bright highlights on another object.

Anti-aliasing: The process of blending the edge of a displayed object to reduce the appearance of sharpness or jagged lines. Typically an algorithm is used that samples colors around the edge of the displayed object in to blend the edge to its surroundings.

Frame rate: For an animated image, the number of individual frames presented during a certain period of time to render movement within the image.

3D: Visual and temporal characteristics of an image which cause the image to appear to be three dimensional to a viewer.

Animation quality: When an animated image is presented, the detail of the animated image is decreased in the periphery of view.

Post processing effects quality

Refraction quality

Figure 3A:
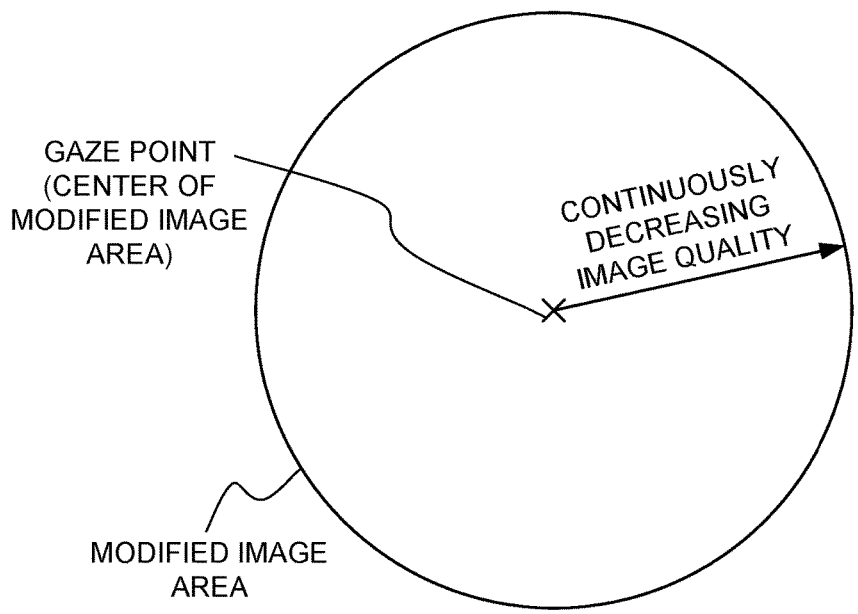
FIG. 3A is a diagram of how image quality may continuously vary within a modified image area.
Figure 3B:
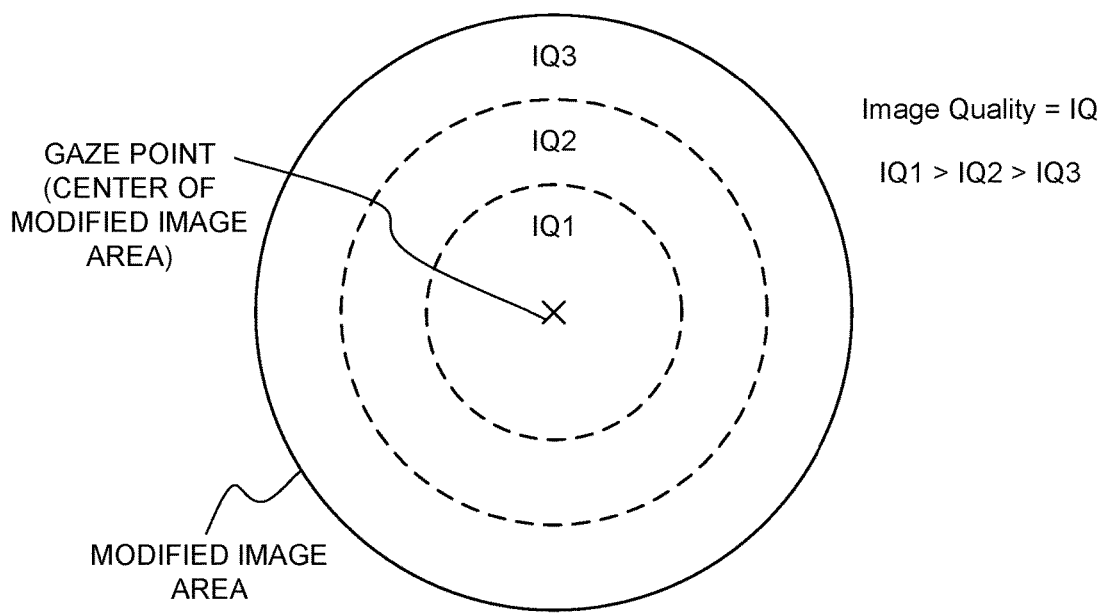
FIG. 3B is a diagram of how image quality may vary in steps within a modified image area.

Three dimensional object quality: Polygons shown based on the distance of the object to the virtual camera The size and shape of the area of the image which may be modified to appear in greater quality can vary depending on the embodiment. Merely by way of example, the shape of the area may be circular, oval, square, rectangular, or polygonal. In some embodiments, the quality of the image within the area may be uniformly increased. In other embodiments, the increase in quality of the image may be greatest at the center of the area (i.e., proximate to the gaze point), and decrease towards the edges of the area (i.e., distal to the gaze point), perhaps to match the quality of the image surrounding the area. To demonstrate, FIG. 3A shows how image quality may decrease in a linear or non-liner continuous manner from the center of a gaze area outward, while FIG. 3B shows how image quality may decrease in a stepped manner from the center of a gaze area outward.

In some embodiments, modifying the image displayed on display device 110 may occur in response to the detection of a change in the gaze point. This may occur in a number of fashions, some of which are described below.

In some embodiments, an entirety of the image may be modified during the period of change in the gaze point of the user, and once the change in the gaze point of the user ceases, either the area around end gaze point of the user or a remainder of the image (portions of the image not around the end gaze point) may be modified. Merely by way of example, in one embodiment, the quality of the entire image may be increased during movement of the user's gaze (sometimes referred to as a saccade), but the increase in quality may only be sustained in an area around the user's end gaze point once the saccade is complete (i.e., the quality of the remainder of the image may be decreased upon completion of the saccade). In a different embodiment, the quality of the entire image may be decreased during a saccade, but the decrease in quality may only be sustained areas besides around the user's end gaze point once the saccade is complete (i.e., the quality of the area of the image around the user's end gaze point may be increased upon completion of the saccade).

Additionally, the use of other system resources, including for example processor/computer 140 and related resources, may also be modified during a user's saccade. For example, non-graphical operations may be supplemented by the resources of processor/computer 140 and graphics processing device 130, during a saccade. More specifically, during a saccade, non-graphical calculations necessary for other system operations may proceed at greater speed or efficiency because additional resources associated with processor/computer 140 and graphics processing device 130 are made available for such operations.

In some embodiments, modifying the image displayed on display device 110 may include modifying a portion of the image in an area around an anticipated gaze point of the user, potentially by increasing the quality thereof. The anticipated gaze point may be determined based on the change in the gaze point of the user. To determine the anticipated gaze point of a user, eye tracking device 120 and/or another processor (i.e., the computer or game consoler's processor), may determine a rate of the change in the gaze point of the user on display device 110, and determine the anticipated gaze point based at least in part on this rate of the change.

The rate of change of the gaze point of the user, also referred to as the velocity or speed of a saccade by the user is directly dependent on the total change in the gaze point of the user (often referred to as the amplitude of the saccade). Thus, as the intended amplitude of a user's saccade increases, so does the speed of the saccade. While the saccade of a human user can be as fast as 900°/second in humans, for saccades of less than or about 60°, the velocity of a saccade is generally linearly and directly dependent on the amplitude of the saccade. For example, a 10° amplitude is associated with a velocity of 300°/second and a 30° amplitude is associated with a velocity of 500°/second. For saccades of greater than 60°, the peak velocity starts to plateau toward the maximum velocity attainable by the eye (900°/second). In response to an unexpected stimulus, a saccade normally takes about 200 milliseconds (ms) to be initiated and then lasts from about 20 to about 200 ms. Based on these relationships between saccade speed and amplitude, embodiments of the invention may determine anticipated gaze points based on saccade velocity. Other predetermined models of mathematical relationships between saccade speed and amplitude may also be employed by various embodiments of the invention to determine an anticipated gaze point.

In some embodiments, the portion of the image modified around the anticipated gaze point may also include the portion of the image around the original gaze point (i.e., the gaze point from which the user's saccade started). While the shape of the portion of the image modified may be any of those shapes described above, in some embodiments it may be a triangle or a trapezoidal shape having a progressively greater width perpendicular to a direction of the saccade as shown in FIG. 4.

Figure 4:
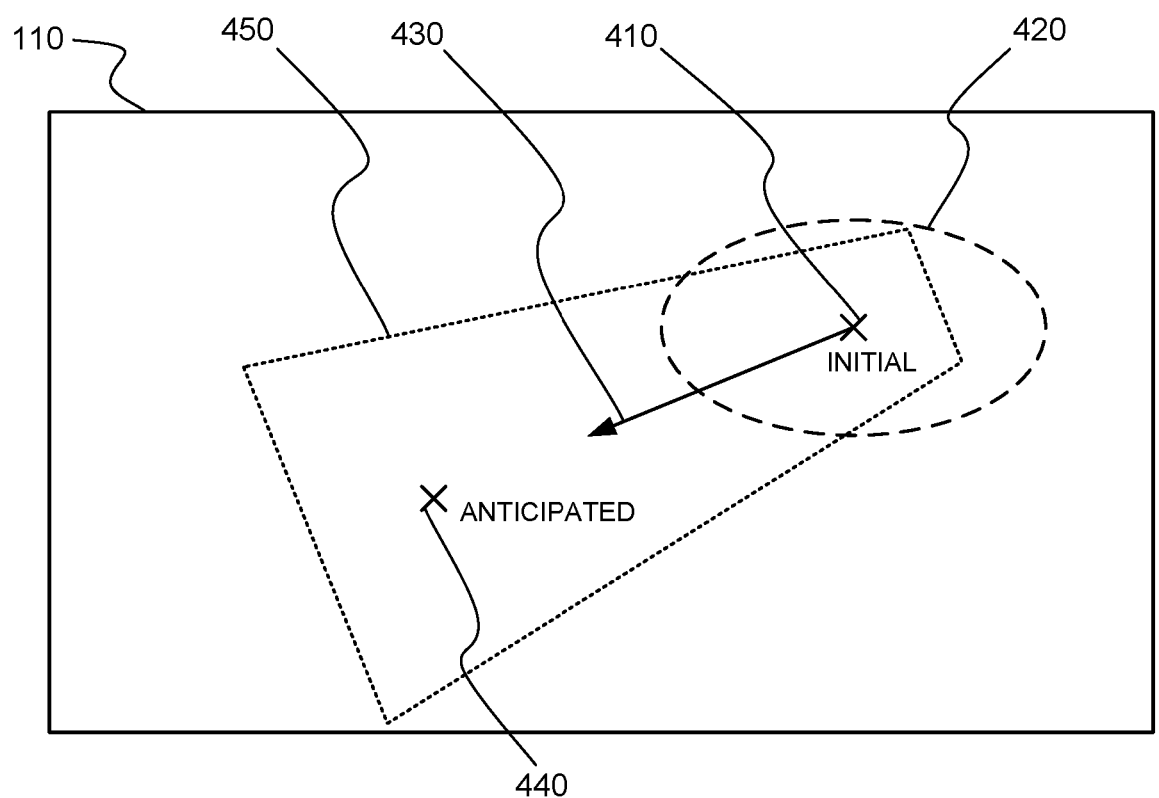
FIG. 4 is a view of a display device of the invention in which image modification is occurring in response to a detected change in a user's gaze point.

In FIG. 4, display device 110 is shown, and an initial user gaze point 410 is shown thereon. Prior to any change in initial gaze point 410, embodiments of the invention may provide increased graphics quality in area 420. When a user saccade, represented by arrow 430, is detected by eye tracking device 120, the size and shape of area 420 may change to accommodate both initial gaze point 410 and anticipated gaze point 440. The changed area 450, while being triangular and/or trapezoidal in this embodiment, may be shaped and sized differently in other embodiments. Merely by way of example, an entire side of display device 110 from the initial gaze point to the edges of the display in the direction of the saccade may also be included in changed area 450 to account for more possibilities of where the user's gaze point may end. In other embodiments, a circular, oval, or square changed area 450 may be provided. In yet other embodiments, changed area 450 may include separate and distinct areas around the initial gaze point 410 and anticipated gaze point 440.

In some embodiments, the size or shape of the area around the gaze point for which an image is modified (or which remains unmodified from a heightened quality in various embodiments), is dynamic. This may occur based at least in part on any number of factors, including the current location of the gaze point relative to the image or display device. Merely by way of example, if a user moves their gaze point to a certain portion of the screen, a predefined portion of the screen may be modified via increased quality therein (for example, a corner portion of the display having a map of a virtual area in a video game). In some embodiments, if enough user saccades having one or more predefined characteristics are detected in predefined amount of time, the entirety of the display may be modified to be rendered in greater quality.

The performance of a computing system may be directly influenced by the consumption of resources the system has at its disposal. These resources include, but are not limited to, processing power, memory size, memory access speed, and computer bus speed. The display of information such as images and other graphical items may directly require the use of such resources. The higher the quality of this information, as has been previously described, the greater the amount of resources required, or the greater level of strain on existing resources. The present invention seeks to decrease the consumption of these resources by allocating graphical processing and execution resources first and primarily to areas of display device 110 that can be readily perceived in high definition by a user, as the areas in which high definition information is actually displayed. Other areas of the display device, which will not be, or cannot easily be, perceived in high definition by a user may be allocated a lesser or remaining amount of resources. Due to latency between the output of information to display device 110 and the speed at which a user can move their eyes and perceive information, it may be desirable to provide a system in which the user does not perceive that there is any change to the quality or definition of information being displayed on the display device 110.

Figure 7A:
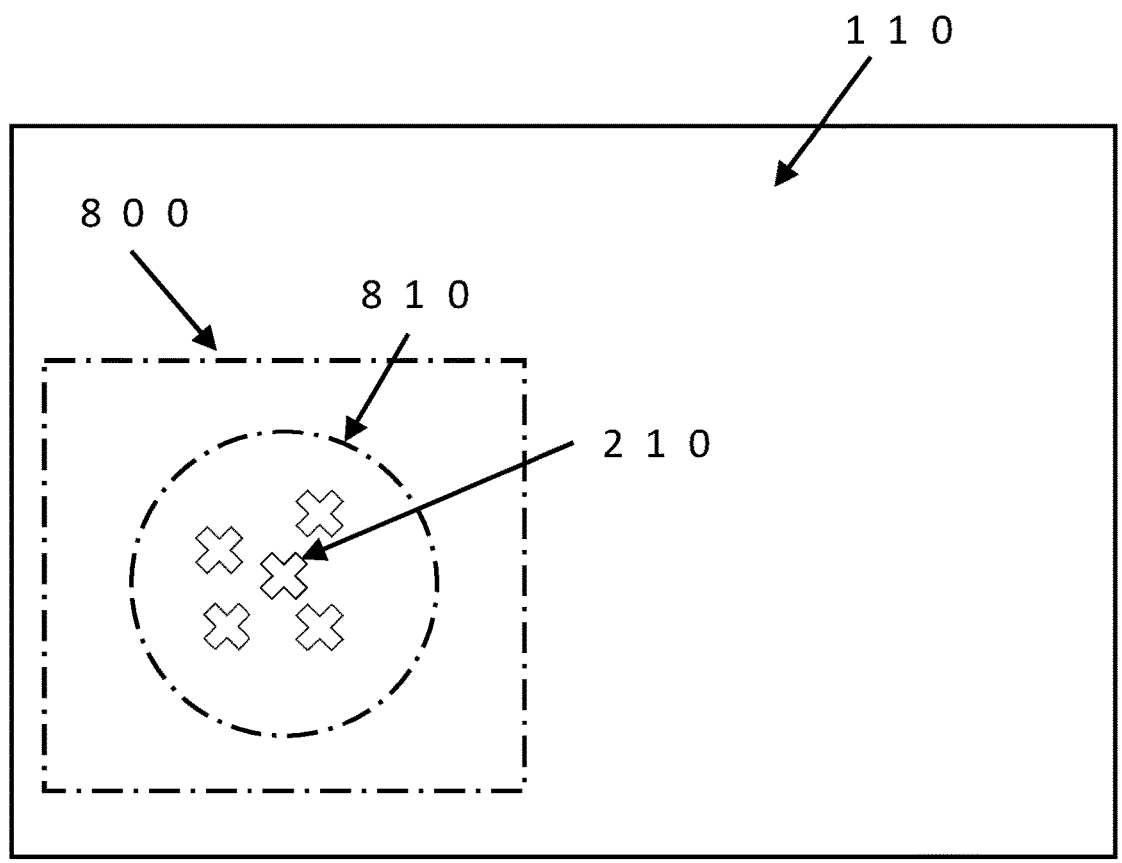
FIGS. 7A and 7B are diagrams showing a change in the location of an area on a display device according to the change in a user's gaze point.
Figure 7B:
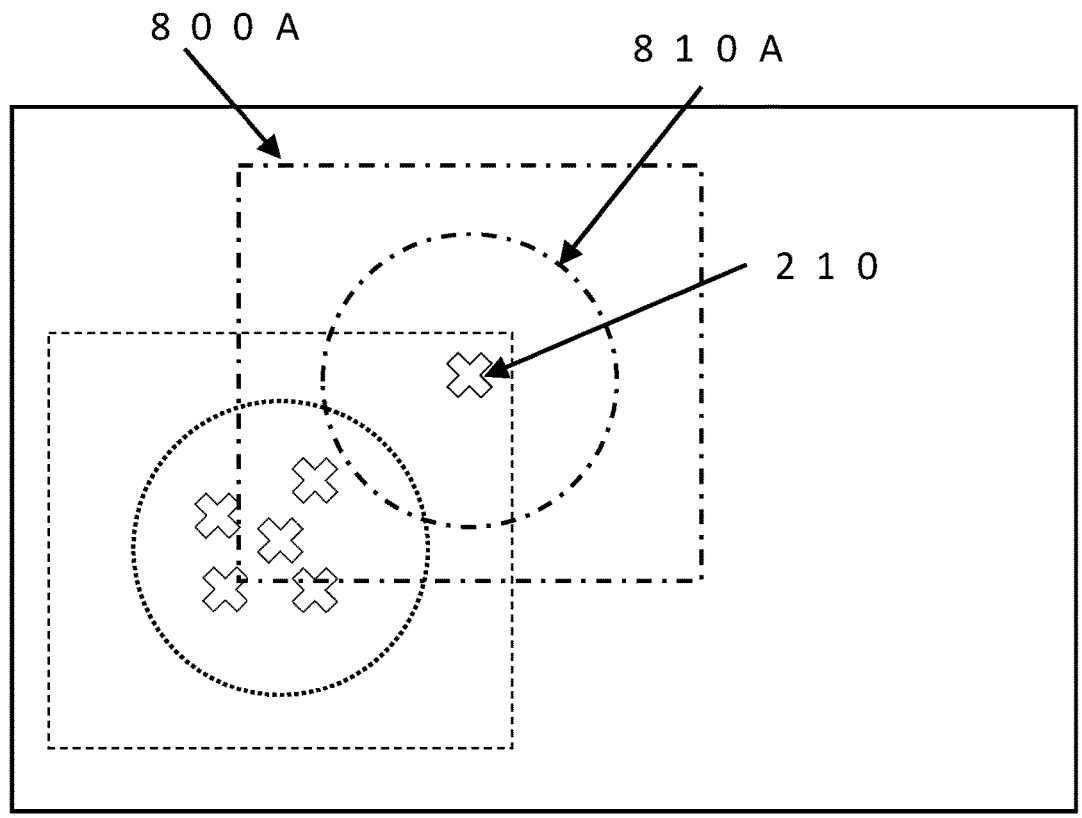

In some embodiments, the gaze point information may be determined by, or based on information from, eye tracking device 120, and may be filtered to minimize the change in areas around the gaze point for which an image may be modified. Referring to FIG. 7A the embodiment includes display device 110 comprising an area 800 containing a sub-area 810. An objective of this and other embodiments may be to maintain high definition and/or other improved graphical rendering qualities in sub-area 810 and/or area 800 around any determined gaze points 210. An image may thus be modified in area 800 such that it contains greater quality graphics or other modified parameters as previously described. If it is determined that a gaze point 210 remains within sub-area 810, the quality of the graphics or the like in area 800 may be modified such that the graphical quality of the images in area 800 are displayed at a higher quality or the like than images outside of area 800 on display device 110. If it is determined that the gaze point is located outside of sub-area 810, as shown in FIG. 7B, a new area 800A is defined containing a new sub-area 810A. New area 800A may then be modified to contain higher quality graphics or other parameters. The invention then repeats, in that if it is determined that the gaze point remains within new sub-area 810A, area 800A remains constant, however if the gaze point is detected outside of new sub-area 810A, area 800A is redefined.

In these or other embodiments, filtering of gaze information may performed to ensure that relocation of area 800 is necessary. For example, the system may determine a gaze point 210 is located outside the sub-area 810 however it may perform no action (such as relocating the area 800) until a predetermined number of gaze points 210 are located outside the sub-area (for example 2, 5, 10, 50). Alternatively, the system could temporarily enlarge area 800 until it is certain the gaze point 210 is located within a certain area. Additionally, predefined time periods may be established to determine if gaze points 210 have moved outside of sub-area 810 for at least those time periods prior to enlarging or changing are 800.

Figure 8:
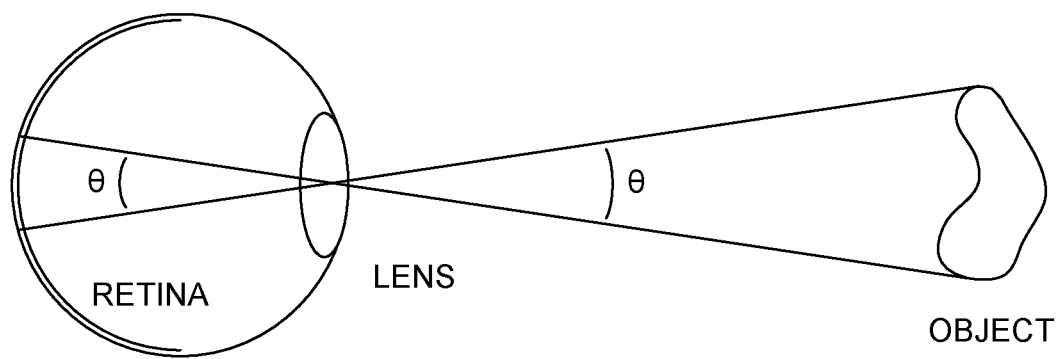
FIG. 8 is a diagram demonstrating an eccentricity angle.

In some embodiments, the size of area 810 may be based on an eccentricity angle of about 1-5 degrees from the currently determined gaze point. In exemplary embodiments, the angle may be about 3 degrees. Although the concept of an eccentricity angle would be well understood by a person of skill in the art, for demonstration purposes, its use in the present embodiment will now be described with reference to FIG. 8.

The eccentricity angle $\theta$ represents a person's fovea vision. In some embodiments, it may be preferable that area 800 is larger than the area labeled "object" in FIG. 8. This means that there may be a high probability that while a person's gaze point 210 remains within the sub-area 810, that person will not be able to perceive information outside the area 800 at high quality. The size of the area labeled "object" on display device 110 is primarily dependent on the physical size of display device 110 and the distance between the eye(s) and display device 110.

The size of area 800 may be modified to affect performance, as the greater the size of area 800, the more system resources are required to render graphics at higher quality. By way of example, the area 800 may be of such size so as to fit within the display 2 to 12 times. This size may be optionally linked directly to the size of display device 110, or to the eccentricity angle, such that the size may scale efficiently. In a further embodiment, gaze point 210 may be determined after adjusting information obtained by eye tracking device 120 to remove noise. Different individuals may have different levels of noise in the gaze information obtained by eye tracking device 120 (for example, due to wandering of their eye(s) about the gaze point). If an individual has a low level of noise, area 800 may be smaller, and thus performance of the system on which the present embodiment is being practiced may be increased.

In another embodiment of the invention, a non-transitory computer readable medium having instructions thereon for presenting graphics on display device 110 is provided. The instructions may be executable by one or more processors to at least display an image on display device 110. The instructions may also be executable to receive information from eye tracking device 120 indicative of at least one of a gaze point of a user on display device 110, or a change in the gaze point of the user on display device 110. The instructions may further be executable to cause graphics processing device 130 to modify the image displayed on display device 110 based at least in part on the gaze point of the user on display device 110, or the change in the gaze point of the user on display device 110. Thus, a non-transitory computer readable medium able to implement any of the features described herein in relation to other embodiments is also provided.

Figure 5:
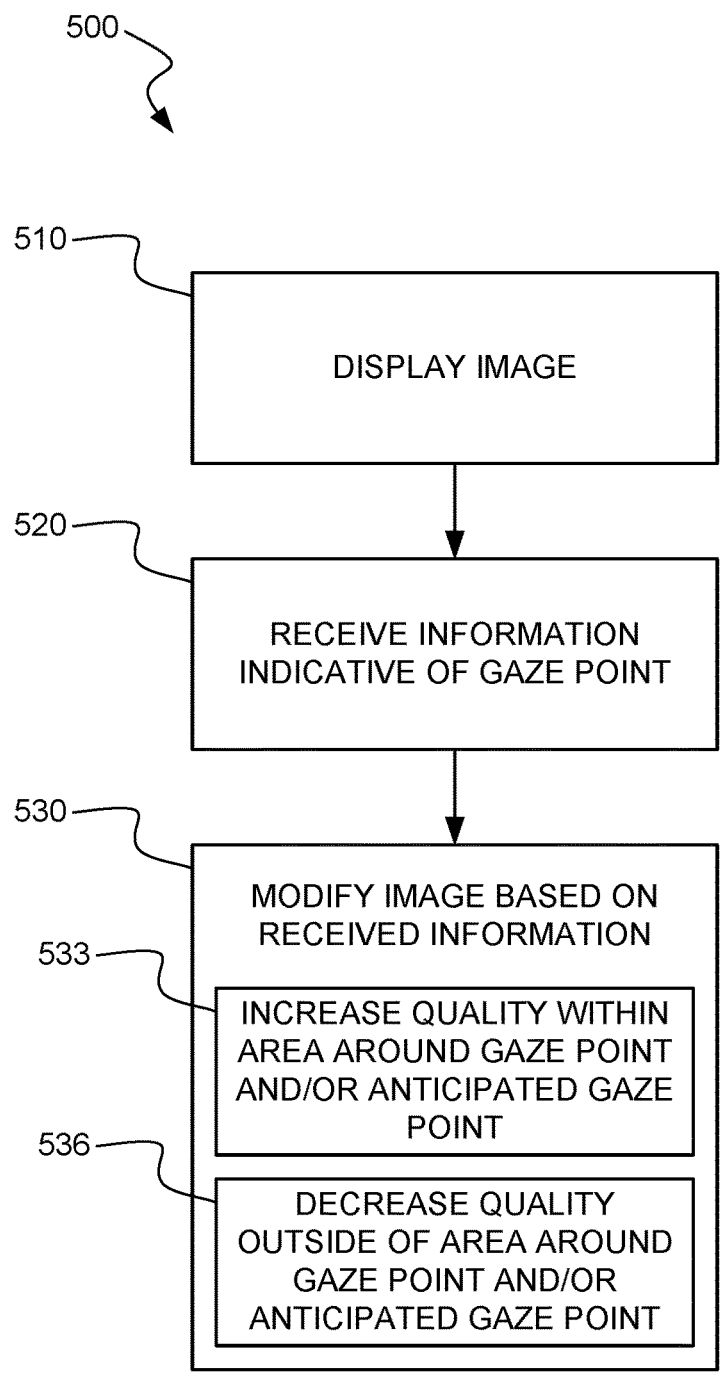
FIG. 5 is flow diagram of one possible method of the invention for modifying an image based on a user's gaze point.

In another embodiment of the invention, a method 500 for presenting graphics on display device 110 is provided as shown in FIG. 5. At step 510, method 500 may include displaying an image on display device 110. At step 520, method 500 may also include receiving information from eye tracking device 120 indicative of at least one of a gaze point of a user on display device 110, or a change in the gaze point of the user on display device 110. At step 530, method 500 may further include causing graphics processing device 130 to modify the image displayed on display device 110 based at least in part on the gaze point of the user on display device 110, or the change in the gaze point of the user on display device 110. Step 530 may include, at step 533, increasing the quality of the image in an area around the gaze point of the user, relative to outside the area. Step 530 may also include, at step 536, decreasing the quality of the image outside an area around the gaze point of the user, relative to inside the area. Thus, a method to implement any of the features described herein in relation to other embodiments is also provided.

In some embodiments, the systems and methods described herein may be toggled on and off by a user, possibly to account for multiple additional viewers of display device 110 being present. In other embodiments, the systems and methods described herein may automatically toggle on when only one user is viewing display device 110 (as detected by eye tracking device 120), and off when more than one user is viewing display device 110 (as detected by eye tracking device 120). Additionally, in some embodiments, the systems and methods described herein may allow for reduction in rendering quality of an entire display device 110 when no viewers are detected, thereby saving system resources and power consumption when display device 110 is not the primary focus of any viewer.

In other embodiments, the systems and methods described herein may allow for modifying multiple portions of an image on display device 110 to account for multiple viewers as detected by eye tracking device 120. For example, if two different users are focused on different portions of display device 110, the two different areas of the image focused on may be rendered in higher quality to provide enhanced viewing for each viewer.

In yet other embodiments, data associated with an image may inform the systems and methods described herein to allow prediction of which areas of an image may likely be focused on next by the user. This data may supplement data provided by eye tracking device 120 to allow for quicker and more fluid adjustment of the quality of the image in areas likely to be focused on by a user. For example, during viewing of a sporting event, a picture-in-picture of an interview with a coach or player may be presented in a corner of the image. Metadata associated with the image feed may inform the systems and methods described herein of the likely importance, and hence viewer interest and likely focus, in the sub-portion of the image.

Figure 6:
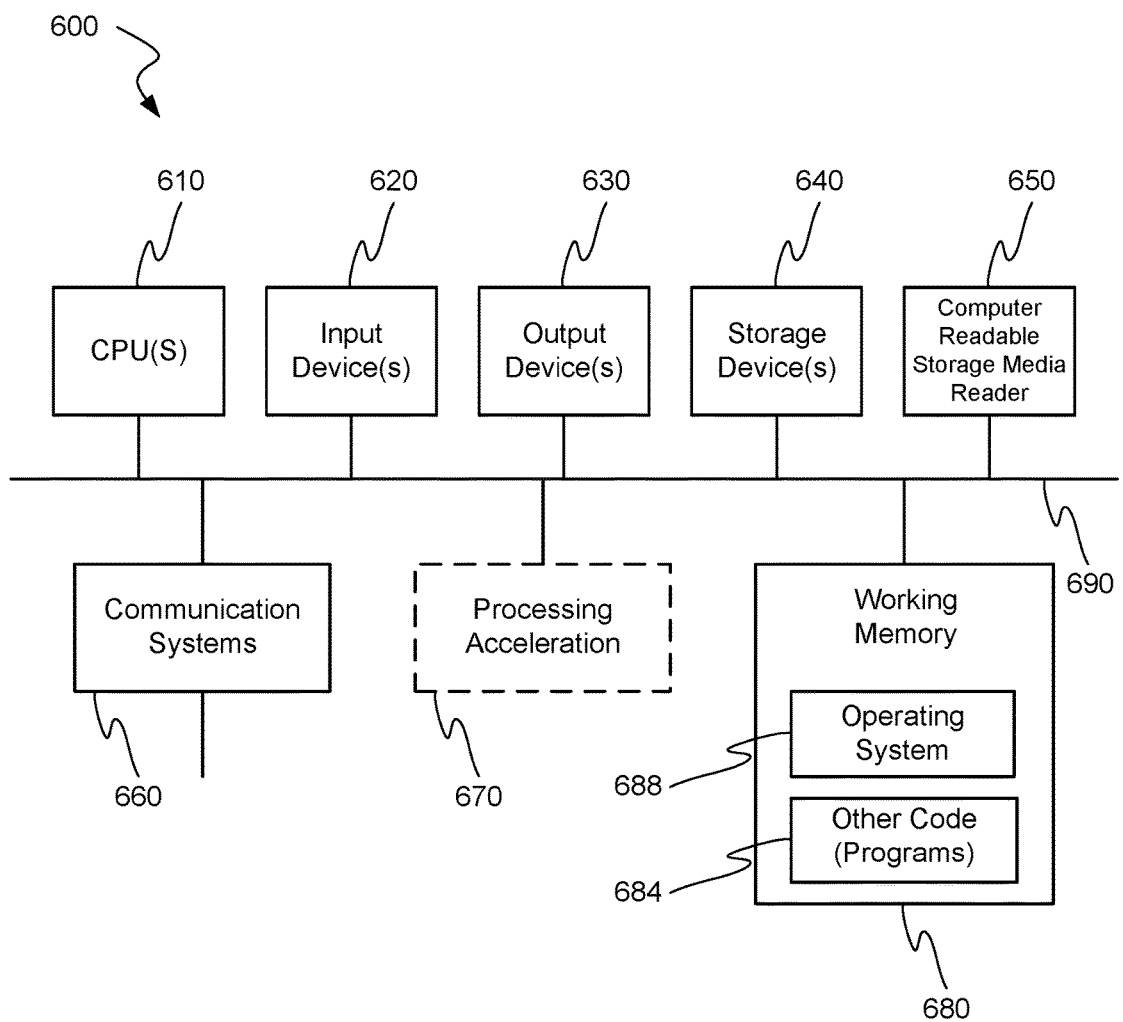
FIG. 6 is a block diagram of an exemplary computer system capable of being used in at least some portion of the devices or systems of the present invention, or implementing at least some portion of the methods of the present invention.

FIG. 6 is a block diagram illustrating an exemplary computer system 600 in which embodiments of the present invention may be implemented. This example illustrates a computer system 600 such as may be used, in whole, in part, or with various modifications, to provide the functions of eye tracking device 120, graphics processing device 130, the game console, the processor/computer 140, and/or other components of the invention such as those discussed above.

For example, various functions of eye tracking device 120 and associated processors may be controlled by the computer system 600, including, merely by way of example, tracking a user's gaze point, determining an anticipated gaze point, controlling graphics processing device 130, etc.

The computer system 600 is shown comprising hardware elements that may be electrically coupled via a bus 690. The hardware elements may include one or more central processing units 610, one or more input devices 620 (e.g., a mouse, a keyboard, etc.), and one or more output devices 630 (e.g., a display device, a printer, etc.). The computer system 600 may also include one or more storage device 640. By way of example, storage device(s) 640 may be disk drives, optical storage devices, solid-state storage device such as a random access memory ("RAM") and/or a read-only memory ("ROM"), which can be programmable, flash-updateable and/or the like.

The computer system 600 may additionally include a computer-readable storage media reader 650, a communications system 660 (e.g., a modem, a network card (wireless or wired), an infra-red communication device, Bluetooth™ device, cellular communication device, etc.), and working memory 680, which may include RAM and ROM devices as described above. In some embodiments, the computer system 600 may also include a processing acceleration unit 670, which can include a digital signal processor, a special-purpose processor and/or the like.

The computer-readable storage media reader 650 can further be connected to a computer-readable storage medium, together (and, optionally, in combination with storage device(s) 640) comprehensively representing remote, local, fixed, and/or removable storage devices plus storage media for temporarily and/or more permanently containing computer-readable information. The communications system 660 may permit data to be exchanged with a network, system, computer and/or other component described above.

The computer system 600 may also comprise software elements, shown as being currently located within a working memory 680, including an operating system 684 and/or other code 688. It should be appreciated that alternate embodiments of a computer system 600 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 600 may include code 688 for implementing any or all of the function of the various elements of the architecture as described herein. For example, software, stored on and/or executed by a computer system such as system 600, can provide the functions of eye tracking device 120, graphics processing device 130, the game console, the processor/computer, and/or other components of the invention such as those discussed above. Methods implementable by software on some of these components have been discussed above in more detail.

The invention has now been described in detail for the purposes of clarity and understanding. However, it will be appreciated that certain changes and modifications may be practiced within the scope of the appended claims.

What is claimed is:

1. A system for presenting graphics on a display device, wherein the system comprises:
    an eye tracking device for determining a gaze point of a user on a display device;
    a graphics processing device for causing graphics to be displayed on the display device;
    wherein the graphics processing device causes graphics displayed on the display device to be of a higher quality in an area including the gaze point of the user than outside the area; and
    wherein a location of the area is changed based at least in part on the eye tracking device determining that at least a predetermined number of gaze points of the user are located outside the area.

2. The system for presenting graphics on a display device of claim 1, wherein the area includes a sub-area containing the gaze point of the user.

3. The system for presenting graphics on a display device of claim 2, wherein while the gaze point of the user remains within the sub-area, the location of the area on the display device does not change.

4. The system for presenting graphics on a display device of claim 2, wherein when the gaze point of the user moves outside the sub-area, a new area having higher quality graphics is located around the gaze point.

5. The system for presenting graphics on a display device of claim 2, wherein a size of the sub-area is based at least in part on the proximity of the user to the display device.

6. The system for presenting graphics on a display device of claim 1, wherein a size of the area is based at least in part on the proximity of the user to the display device.

7. The system for presenting graphics on a display device of claim 1, wherein a size of the sub-area is based at least in part on an eccentricity angle between a user's eye and the display device.

8. The system for presenting graphics on a display device of claim 1, wherein the gaze point of a user on the display device, as determined by the eye tracking device, includes noise.

9. The system for presenting graphics on a display device of claim 8, wherein a size of the sub-area is based at least in part on the amount of noise included in the gaze point of the user as determined by the eye tracking device.

10. The system for presenting graphics on a display device of claim 1, wherein higher quality comprises at least one selection from a group consisting of:
    increased resolution;
    increased shading quality;
    increased texture mapping quality;
    increased quality of reflection rendering;
    increased anti-aliasing;
    increased frame rate;
    increased three-dimensional rendering quality;
    increased animation quality
    increased post-processing effects quality;
    increased refraction quality; and
    increased three dimensional object quality.

11. A method for presenting graphics on a display device, wherein the method comprises:
    determining, with an eye tracking device, a gaze point of a user on a display device;
    causing, with a graphics processing device, graphics to be displayed on the display device;
    wherein the graphics processing device causes graphics displayed on the display device to be of a higher quality in an area including the gaze point of the user than outside the area; and
    wherein at least one of a shape or a size of the area is changed based at least in part on the eye tracking device determining that at least a predetermined number of gaze points of the user are located outside the area.

12. The method for presenting graphics on a display device of claim 11, wherein the area having higher quality graphics includes a sub-area containing the gaze point of the user.

13. The method for presenting graphics on a display device of claim 12, wherein while the gaze point of the user remains within the sub-area, the location of the area on the display device does not change.

14. The method for presenting graphics on a display device of claim 12, wherein when the gaze point of the user moves outside the sub-area, a new area having higher quality graphics is located around the gaze point.

15. The method for presenting graphics on a display device of claim 12, wherein a size of the sub-area is based at least in part on the proximity of the user to the display device.

16. A non-transitory machine readable medium having instructions thereon for presenting graphics on a display device, the instructions executable by one or more processors to at least:
 determine a gaze point of a user on a display device;
 cause graphics to be displayed on the display device;
 wherein the graphics displayed on the display device are of a higher quality in an area including the gaze point of the user than outside the area; and
 wherein a location of the area is changed based at least in part on the eye tracking device determining that the gaze point of the user is located outside the area for at least a predetermined period of time.

17. The non-transitory machine readable medium of claim 16, wherein the area having higher quality graphics includes a sub-area containing the gaze point of the user.

18. The non-transitory machine readable medium of claim 17, wherein while the gaze point of the user remains within the sub-area, the location of the area on the display device does not change.

19. The non-transitory machine readable medium of claim 17, wherein when the gaze point of the user moves outside the sub-area, a new area having higher quality graphics is located around the gaze point.

20. The non-transitory machine readable medium of claim 17, wherein a size of the sub-area is based at least in part on the proximity of the user to the display device.

21. A wearable device for presenting graphics to a user, wherein the wearable device comprises:
 an eye tracking device for determining a gaze point of a user on a display device;
 a processing device for causing graphics to be displayed on the display device;
 wherein the processing device causes graphics displayed on the display device to be of a higher quality in an area including the gaze point of the user than outside the area;
 wherein at least one of a shape or a size of the area is changed by the processing device based at least in part on the eye tracking device determining that the gaze point of the user is located outside the area for at least a predetermined period of time.

22. The wearable device of claim 21, wherein the area having higher quality graphics includes a sub-area containing the gaze point of the user.

23. The wearable device of claim 22, wherein while the gaze point of the user remains within the sub-area, the location of the area on the display device does not change.

24. The wearable device of claim 22, wherein when the gaze point of the user moves outside the sub-area, a new area having higher quality graphics is located around the gaze point.

* * * * *